United States Patent [19]

Tijssen et al.

[11] Patent Number: 4,536,556
[45] Date of Patent: Aug. 20, 1985

[54] PROCESS FOR THE PREPARATION OF A COPOLYMER COMPRISING ALPHA-METHYLSTYRENE AND ACRYLONITRILE

[75] Inventors: Jan Tijssen, Spaubeek; Jozef L. M. van der Loos, Sittard, both of Netherlands

[73] Assignee: Stamicarbon B.V., Geleen, Netherlands

[21] Appl. No.: 548,769

[22] Filed: Nov. 4, 1983

Related U.S. Application Data

[63] Continuation-in-part of Ser. No. 427,276, Sep. 29, 1982, abandoned, which is a continuation of Ser. No. 276,639, Jun. 23, 1981, abandoned.

[30] Foreign Application Priority Data

Jul. 1, 1980 [NL] Netherlands ..................... 8003798
May 16, 1981 [NL] Netherlands ..................... 8102415

[51] Int. Cl.$^3$ ................. C08F 212/10; C08F 212/12
[52] U.S. Cl. .................................... 526/342; 525/238
[58] Field of Search ..................... 526/342; 524/565

[56] References Cited

U.S. PATENT DOCUMENTS 4,169,195 9/1979 Rinehart .............................. 526/342
4,200,593 4/1980 van der Loos et al. ............. 526/342

Primary Examiner—Harry Wong, Jr.
Attorney, Agent, or Firm—Cushman, Darby & Cushman

[57] ABSTRACT

An improved process for the preparation of heat resistant copolymers of an alpha-methylstyrene and acrylonitrile by polymerization thereof in aqueous emulsion, and in the presence of a free-radical-supplying compound and a chain-transfer agent. The polymerization reaction is insufficiently cooled to remove all of the released reaction heat, and in combination therewith the polymerization is conducted at a temperature of the aqueous emulsion maintained at a level of at most 110°, while further maintaining the mean rate of temperature increase per hour, v, at a value of at most 60° C. per hour, wherein v is determined by the formula:

$$v = \frac{T_m - T_o}{t_m - t_o}$$

in which:

$T_m$ = maximum temperature of the aqueous emulsion (°C.),
$T_o$ = temperature of the aqueous emulsion at the start of the polymerization (°C.)
$t_m$ = time in hours at which $T_m$ is reached, and
$t_o$ = time in hours at which the polymerization is started whereby the rate of monomer conversion is maximized.

3 Claims, No Drawings

PROCESS FOR THE PREPARATION OF A COPOLYMER COMPRISING ALPHA-METHYLSTYRENE AND ACRYLONITRILE

This is a continuation-in-part of application Ser. No. 06/427,276, filed Sept. 29, 1982, now abandoned, which in turn is a continuation of application Ser. No. 06/276,639 filed June 23, 1981, also now abandoned.

The invention relates to a process for the preparation of a copolymer of alpha-methylstyrene and acrylonitrile in aqueous emulsion, in the presence of a compound supplying free radicals, according to which not all of the reaction heat released during the polymerization is removed by cooling, so that the rate of monomer conversion exhibits a maximum, to an object manufactured from such a copolymer, and to the use of such a copolymer to improve the heat resistance of ABS.

A similar process in aqueous dispersion is known from the U.S. Pat. No. 4,200,593.

In the preparation of a copolymer by polymerizing a mixture of alphamethylstyrene and acrylonitrile, which may contain a secondary amount of styrene, it is important to use such reaction conditions that maximum heat resistance is attained.

Measures to this effect include:
1. a high polymerized alpha-methylstyrene content,
2. a very low residual monomer content, and
3. a raise in molecular weight.

All these measures, each by itself or combined, can have a marked influence on the heat resistance. However, from investigations by applicant it appears that in this way the maximum value of heat resistance feasible is still not attained.

The aim of the invention is to offer a process for the preparation of a copolymer of alpha-methylstyrene and acrylonitrile which results in a very good heat resistance of the copolymer.

In U.S. Pat. No. 4,169,195 of Rinehart, a process for the preparation of polymers containing greater than 60 wt.% alphamethylstyrene, from 28 to 35 wt.% acrylonitrile and from 0 to 7 wt.% styrene is described. These polymers result from suspension polymerization of the monomer mixture above 90° C.

The improved polymerization process of this invention, however is carried out under emulsion polymerization conditions.

As is well known in the art, emulsion polymerization of styrene and acrylonitrile is governed by principles different from those of suspension polymerization (see Report of Standard Research Institute, Report no. 20, ABS Resins, 1966, page 44–50). In an emulsion process much more reaction heat is produced than in a suspension process because the rate of polymerization is higher. Therefore, in an emulsion process, much more reaction heat has to be transferred by cooling than in a suspension process. Because alpha-methylstyrene is chemically similar to styrene, it can be used in place of styrene either partially or totally in the production of styrene-acrylonitrile copolymer (see page 37 of the SRI-report).

In U.S. Pat. No. 4,200,593 of Van der Loos a polymerization process in which a second free-radical supplying compound is added to the reaction mixture at a temperature between 30° C. and 120° C., is described. No mention is made of a temperature maximum during the reaction. The patent includes the possibility of a temperature above 110° C., which according to our present invention is not permitted. In our present invention chain transfer agents are included, in U.S. Pat. No. 4,200,593, however, no mention is made of the use of a chain transfer agent.

The process according to the invention is characterized in conducting the polymerization at a temperature of the aqueous emulsion maintained at a level not higher than 110° C., and while further maintaining the mean rate of temperature increase per hour at a value of at most 60° C. per hour.

By preference, the temperature of the aqueous emulsion is not allowed to rise above 95° C., more in particular 90° C.

The mean rate of temperature increase per hour, v, is determined by the following formula:

$$v = \frac{T_m - T_o}{t_m - t_o}$$

in which:

$T_m$ = maximum temperature of the aqueous emulsion (°C.)

$T_o$ = temperature of the aqueous emulsion at the start of the polymerization (°C.)

$t_m$ = time in hours at which $T_m$ is reached, and $t_o$ = time in hours at which the polymerization is started, whereby the rate of monomer conversion is maximized.

By preference the temperature rise is kept below maximally 30° C. per hour, more in particular 25° C. per hour.

It is very surprising that in this way it is possible to obtain a copolymer of alpha-methylstyrene and acrylonitrile having improved heat resistance.

In a semi-adiabatic emulsion polymerization, as described above, part of the reaction heat is transferred by cooling. However, it is important that not all of the reaction heat released be transferred by cooling. There must still be an observable maximum in the temperature-time curve.

By preference, rate v is kept at a value above 5° c. per hour.

There are various possible realizations of the process according to the invention. The initial temperature, for example, may be chosen in dependence on the active range of the initiator or initiators used. Besides, it is possible to add, to the reaction mixture, con or intermittently, a cooled liquid, e.g. water, monomers and/or an emulsion, which may contain additives.

A third possibility consists in installing and controlling an external cooling system with cooling water or some other cooling liquid.

Combinations of these alternatives may also be applied.

The copolymer of alpha-methylstyrene and acrylonitrile consists essentially of 20–40% by weight of acrylonitrile and 60–80% by weight of alpha-methylstyrene.

The copolymers of alpha-methylstyrene and acrylonitrile to be prepared according to the invention may contain minor quantities of one or more other monomers in addition. These quantities must be less than 10% by weight with respect to the copolymer, more preferably less than 5% by weight. Examples of such monomers are methacrylonitrile, methyl methacrylate, ethyl acrylate and styrene. It is also possible to prepare the copolymer of alpha-methylstyrene and acrylonitrile in the presence of a rubber, such as polybutadiene, butadiene-styrene rubber, butadiene-acrylonitrile rubber, polychloroprene, acrylate rubber, ethylene-propylene rubber and/or EPDM rubber.

The emulsion polymerization may be carried out batch-wise, semi-continously or continuously.

When the polymerization is carried out semi-continuously, the rate of temperature rise is calculated per stage, while in a continuous polymerization the rate is calculated on the basis of the average residence time of monomer/copolymer from the beginning of the polymerization to the moment of maximal temperature of the aqueous emulsion.

An attendant advantage of the process according to the invention is that in the polymerization in the aqueous emulsion the recovery of the copolymer emulsion obtained is improved. This is apparent especially in coagulation, centrifugation and drying of the copolymer. The bulk density and dry flow of the copolymer powder obtained are very good, so that it can be processed to granulate or directly to moulded products without any problems.

In the polymerization the usual necessary auxiliary agents have to be applied, such as emulsifiers, alkalis, salts, soaps, compounds supplying free radicals and chain control agents.

Suitable chain control agents are organosulphur compounds such as the commonly used mercaptans and the dialkyldixanthogenes, diaryldisulphides, mercaptothiazoles, tetra-alkylthiurammono- and disulphides and the like, by themselves or mixed with each other, as well as hydroxy compounds, such as terpinolenes. Also the dimer of alpha-methylstyrene or alpha-alkenes with relatively long chains may be applied. The commercially most widely used chain control agents are especially the mercaptan compounds and of these the hydrocarbyl mercaptans with 8-20 carbon atoms in the molecule are often used at the moment. More in particular mercaptans with a tertiary alkylgroup are preferred.

The amount of chain control agent may vary within wide limits in dependence on the mixture chosen, the specific compound, polymerization temperature, emulsifier and other variables of the recipe.

A good result can be attained by using 0.01-5 parts by weight of organosulphur compounds (per 100 parts by weight of monomer), by preference 0.05-2 parts by weight. Suitable organosulphur compounds include n-octyl mercaptan, n-dodecyl mercaptan, tertiary dodecyl mercaptan, tertiary nonylmercaptan, tertiary hexadecyl mercaptan, tertiary octadecyl mercaptan, tertiary eicosyl mercaptan, secondary octyl mercaptan, secondary tridecyl mercaptan, cyclododecyl mercaptan, cyclododecadienyl mercaptan, aryl mercaptan such as 1-naphthalene thiol and the like, bis(tetrahydrofural xanthogene), diphenyldisulphide, tetramethyl thiuram disulphide, 2-mercaptobenzathiazole and the like. Mixture of these compounds may also be used.

For an emulsifier, very different compounds can be used, such as disproportionated resin soap, fatty-acid soap, mixtures of these compounds, arylsulphonates, alkylaryl sulphonates and other surface-active compounds and mixtures thereof. Non-ionic emulsifiers, such as polyethers and polyols, may also be used. The amounts of the emulsifiers that are used depend on the type as well as on the reaction parameters and the concentrations of ppolymerizable monomer in the emulsion-polymerization system.

Suitable compounds supplying free radicals for the emulsion polymerization process are organic or inorganic peroxides, hyroperoxides, azo-compounds, as well as redox-initiator systems. These compounds can be added at the start of the polymerization. It is also possible to add part of these compounds at the start and part during the polymerization. The amount of these compounds is advantageously between 0.001-10 wt.-% (w.r.t. the monomers).

By preference, alkali or ammonium persalts and/or redox systems are used as initiators. In particular potassium persulphate, ammonium persulphate and sodium persulphate should be mentioned. Examples of suitable redox systems are persalts (for example perch or persulphates), tertiary butyl hydroperoxide, cumene hydroperoxide, diisopropylbenzene hydroperoxide and methylcyclohexyl hydroperoxide, combined with reduction agents on the basis of acids which contain sulphur with a low valence number, such as sodiumformaldehydesulphoxylate, bisulphide, pyrosulphide, or with organic bases such as triethanolamine with dextrose, sodiumpyrophosphate and mercaptans or combinations thereof, optionally in combination with metal salts such as ferrosulphate. These initiators or initiator systems can be supplied in one go, step-wise or even gradually. The choice of initiator or initiator system in essence determines the temperature at which the polymerization starts.

The method of coagulation depends on the emulsifier used. In the case of an anionic or cationic emulsifier having been used (that is to say, an emulsifier which is active only in a particular pH range), the coagulation can be effected by changing the pH of the latex.

The application of emulsifiers which become inactive at increased electrolyte concentrations enables coagulation of the latex by addition of suitable electrolytes such as calcium chloride, aluminium chloride or sodium sulphate.

After the coagulation the coagulated latex is separated from the aqueous phase, washed and subsequently dried. The polymer powder obtained can then by further processed to granulate.

The copolymer of alpha-methylstyrene is used especially for the improvement of the heat resistance of other synthetic materials, in particular synthetic materials containing styrene, such as ABS. In addition, the copolymer is used as such, for example in household and/or electric goods, as well as for certain motorcar parts.

The invention will now be elucidated by means of the following non-restricting examples.

EXAMPLE I

The polymerization was carried out in a 100-liter reactor with a rapid stirrer (tip speed 5.1 m/s). Under nitrogen, the reactor was filled with 56 l oxygen-free deionized water, in which 45 g KOH and 485 g rosin soap were dissolved. Subsequently, 7.77 kg acrylonitrile, 16.51 kg alpha-methylstyrene and 228 g tert. dodecyl mercaptan (TDDM) were supplied. With continuous stirring, the reaction mixture was heated to 50° C., after which 152 g potassium persulphate (KPS) dissolved in 5 l deionized oxygen-free water was added. For 30 minutes the temperature was kept constant at 50° C., after which in 90 minutes the polymerization temperature was gradually raised to a value between 85° C. and 95° C.

105 minutes after raising the temperature, another 152 g KPS dissolved in 5 l water was added to the reaction mixture. Subsequently, the temperature was kept constant for another 30 minutes, after which the reaction mixture was cooled by means of an external cooling system with cooling water to 60° C. in 60 minutes, and was discharged.

The polymer latex thus obtained proved to be well coagulable with $H_2SO_4$ at a temperature of 90° to 95° C. The powder obtained was separated out, washed and dried. 23.3 kg polymer with a moisture content 2% and a free-monomer content 0.7% was obtained.

The bulk density (according to ASTM D-1895) and the dry flow of the powder were determined (see table), for it has been found that the values of bulk density and dry flow after recovery and drying of the polymer are indicative of the progress of the coagulation. The higher the bulk density and the lower the dry flow, the better the processability of the polymer.

The dry flow was determined according to ASTM standard No. D-1895, with the following differences:
(1) the outlet was 25 mm instead of 9.5 mm
(2) the slope was 30° instead of 20°
(3) the funnel filling was 300 g Dry flow values greater than approx. 30 seconds cause problems in the processing of the product. By preference, the dry flow amounts to 10–20 seconds.

In the case of a copolymer of alpha-methylstyrene and acrylonitrile, for instance, a bulk density of less than 300 kg/m$^3$ will cause problems in the coagulation, separation of the polymer and the water, drying and further processing to granulates.

The product appeared to have a high HDT [(annealed at 105° C.) determined according to ASTM D-648 with a load of 1820 kPa (18.5 bar)], viz. 117° C.

EXAMPLE II

The polymerization was carried out in a reactor with an effective volume of approx. 28 m$^3$. An amount of 15.3 m$^3$ deionized water of 50° C. in which 129.2 kg emulsifier and 9.1 kg KOH were dissolved was supplied to the reactor. To this, subsequently 52 kg tert. dodecylmercaptan, 2564 l acrylonitrile and 4827 l alpha-methylstyrene were added. After the reaction mixture had been heated to a temperature of 50° C. it. During this addition, the reaction mixture was stirred at a tip speed of 1.9 m/s, which is rather low for such a reactor. In 2.5 hours the temperature was raised to 90° C. 15 minutes after this maximum temperature had been reached, another 51.7 kg potassium persulphate dissolved in 2.2 m$^3$ water was supplied to the reactor. Subsequently the temperature was gradually decreased to 60° C. over a period of approx. 2 hours, after which the polymer latex obtained was led to a coagulation vessel. The coagulation was carried out with $H_2SO_4$ at approx. 93° C. The powder obtained was recovered by centrifugation, washed and dried to a moisture content 1% 6,380 kg polymer with a free-monomer content of 0.4% alpha-methylstyrene and 0.02% acrylontrile was obtained. For the properties of this product see the table.

EXAMPLE III

This example is analogous to Example I, but the temperature gradient changed as follows: the initiator was added to the reaction mixture at 60° C. and subsequently the reaction mixture was heated to a peak temperature of 98° C. in 50 minutes. Then the temperature was lowered to 90° C. in 60 minutes, after which the extra KPS was added. The temperature was kept constant for another 30 minutes and subsequently lowered at 60° C. in 60 minutes.

For the properties of the product see the table.

EXAMPLE IV

In this example, the amounts of monomer, water, soap and chain control agent used were the same as in Example I, but the initiation was carried out with the redox system potassium persulphate, sodium metabisulphite and ferrosulphate. An addition was made of 152 g KPS, 107 g sodium metabisulphite and 1.2 g ferrosulphate.

The redox system was added to the reaction mixture at 45° C., after which the temperature was raised to 95° C. in 40 to 45 minutes. The temperature was then lowered to 90° C. in 30 minutes, after which the same amount of extra KPS as in Example I was added. Subsequently, the temperature was kept constant for another 30 minutes and then lowered to 60° C. in 60 minutes.

For the properties of the product see the table.

EXAMPLE V

This example is analogous to Example I but the temperature gradient was such that $T_m$ was 115° C. In order to achieve this, the initiator was added at 70° C. The temperature of the reaction mixture rose to 108° C. within 60 minutes and then gradually rose further to 115° C. This maximum temperature was reached after 95 minutes. In 30 minutes the temperature was lowered to 85° C., after which the extra KPS was added, the temperature was kept constant for another 30 minutes and subsequently lowered to 60° C. in 60 minutes.

| | examples | | | | |
|---|---|---|---|---|---|
| | according to the invention | | | not according to the invention | |
| | I | II | III | IV | V |
| V °C./hr | 17.5–22.5 | 16 | 45.6 | 67–75 | 28.4 |
| $T_{max}$ °C. | 85–95 | 90 | 98 | 95 | 115 |
| HDT °C. | 117 | 118 | 116 | 112 | 111 |
| bulk density, kg/m$^3$ | 420 | 450 | 380 | 270 | 370 |
| dry flow, seconds | 12 | 16 | 22 | 31 | 42 |

The examples clearly show that polymerizations carried out according to the invention produce an emulsion which is well coagulable and that the powders obtained thereby combine good heat resistance with good dry flow during subsequent processing.

We claim:

1. In a process for the copolymerization of alpha-methylstyrene and acrylonitrile wherein said monomers are co-polymerized
   (a) in aqueous emulsion, and
   (b) in the presence of a free-radical-supplying compound and a chain-transfer agent, and
   (c) wherein the polymerization reaction is insufficiently cooled to remove all of the released reaction heat,
the improvement in combination therewith consisting essentially in conducting said polymerization at a temperature of the aqueous emulsion maintained at a level of at most 110° C. and while further maintaining the mean rate of temperature increase per hour, v, at a value in the range of between 5° and 60° C. per hour, wherein v is determined by the formula:

$$v = \frac{T_m - T_o}{t_m - t_o}$$

in which:
- $T_m$ = maximum temperature of the aqueous emulsion (°C.),
- $T_o$ = temperature of the aqueous emulsion at the start of the polymerization (°C.)
- $t_m$ = time in hours at which $T_m$ is reached, and
- $t_o$ = time in hours at which the polymerization is started, whereby the rate of monomer conversion is maximized, and whereby a heat resistant copolymer is obtained.

2. Process according to claim 1, characterized in that the temperature of the aqueous emulsion is not allowed to become higher than 95° C.

3. Process according to claim 1 characterized in that the mean rate of temperature increase per hour is kept at a value below 30° C.

* * * * *